United States Patent
Shahmansoori et al.

(10) Patent No.: US 12,231,280 B2
(45) Date of Patent: *Feb. 18, 2025

(54) METHOD, COMPUTER PROGRAM, SYSTEM, AND COMMUNICATION DEVICE FOR OPTIMIZING THE CAPACITY OF COMMUNICATION CHANNELS

(71) Applicant: Mitsubishi Electric Corporation, Tokyo (JP)

(72) Inventors: Arash Shahmansoori, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/928,787

(22) PCT Filed: Mar. 12, 2021

(86) PCT No.: PCT/JP2021/011559
§ 371 (c)(1),
(2) Date: Nov. 30, 2022

(87) PCT Pub. No.: WO2021/256039
PCT Pub. Date: Dec. 23, 2021

(65) Prior Publication Data
US 2023/0261923 A1 Aug. 17, 2023

(30) Foreign Application Priority Data
Jun. 19, 2020 (EP) .................... 20305672

(51) Int. Cl.
*H04L 27/34* (2006.01)
*H04L 1/00* (2006.01)
*H04L 25/03* (2006.01)

(52) U.S. Cl.
CPC ........ *H04L 27/3405* (2013.01); *H04L 1/0001* (2013.01); *H04L 25/03171* (2013.01)

(58) Field of Classification Search
CPC ........... H04L 25/0202; H04L 25/03171; H04L 27/3405; H04L 1/0001
(Continued)

(56) References Cited

U.S. PATENT DOCUMENTS 7,428,265 B1 * 9/2008 Adireddy .......... H04L 25/03057
375/348

FOREIGN PATENT DOCUMENTS

CN 110798274 A 2/2020
WO WO2015/162416 A1 10/2015

OTHER PUBLICATIONS

Zhao et al., Dynamic and Flexible OFDM System Based on Joint Coded Modulation, Published In: IEEE Access (vol. 8), pp. 86057-86064, Date of Publication: May 8, 2020 (Year: 2020).*

(Continued)

*Primary Examiner* — Leila Malek
(74) *Attorney, Agent, or Firm* — Birch, Stewart, Kolasch & Birch, LLP

(57) ABSTRACT

The invention relates to a method for optimizing a capacity of a communication channel in a communication system comprising at least a transmitter (10), a receiver (11), and the communication channel (12) between the transmitter and the receiver. The transmitter (10) uses a finite set of symbols $\Omega=\{\omega_1, \ldots, \omega_N\}$ having respective positions on a constellation, to transmit a message including at least one symbol on said communication channel (11). The communication channel (11) is characterized by a conditional probability distribution $\rho_{Y|X}(y|x)$, where y is the symbol received at the receiver (12) while x is the symbol transmitted by the transmitter. More particularly, the conditional probability (Continued)

distribution $\rho_{Y|X}(y|x)$ is obtained, for each possible transmitted symbol x, by a mixture model using probability distributions represented by exponential functions. An optimized input distribution $p_x(x)$ is computed, based on parameters of the mixture model, to define optimized symbols positions and probabilities to be used at the transmitter for optimizing the capacity of the channel.

15 Claims, 3 Drawing Sheets

(58) Field of Classification Search
USPC .......................................................... 375/262
See application file for complete search history.

(56) References Cited

OTHER PUBLICATIONS

International Search Report, issued in PCT/JP2021/011559, PCT/ISA/210, dated Jun. 21, 2021.
Written Opinion of the International Searching Authority, issued in PCT/JP2021/011559, PCT/ISA/237, dated Jun. 21, 2021.
Zheng et al., "Performance Analysis of Coded OFDM Systems Over Frequency-Selective Fading Channels", GLOBECOM 2003, IEEE Global Telecommunications Conference, Dec. 1, 2003, vol. 3, p. 1623-1627.

* cited by examiner

METHOD, COMPUTER PROGRAM, SYSTEM, AND COMMUNICATION DEVICE FOR OPTIMIZING THE CAPACITY OF COMMUNICATION CHANNELS

TECHNICAL FIELD

The present invention relates to the field of telecommunications and more particularly targets the problem of optimizing the capacity of communication channels.

BACKGROUND ART

The optimization can be implemented by computer means and more particularly for example by artificial intelligence, and can be based on observations of whether transmitted messages via communication channels from a transmitter are well received or not at a receiver.

Especially, the case of mixture channels where the optimal input distribution cannot be obtained theoretically, is difficult to address. The probability distribution can be decomposed on a functional basis.

The essential characteristics of a memoryless communication channel can be represented by the conditional probability distribution $p_{Y|X}(y|x)$ of the output Y given the input X. Some examples of well-known communication channels are given below:
- The additive white Gaussian noise channel, where $Y=X+\eta$ and $\eta$ is Gaussian-distributed models corresponds to a wired communication subject to perturbations caused by the thermal noise at the receiver,
- The fading channel $Y=a \cdot X+\eta$ where a follows a fading distribution (such as a Rayleigh distribution), models the transmission over a narrow-band wireless channel in a radio propagation environment involving rich scattering,
- More complicated channels can involve non-linear effects. This is for example the case of optical channels where the Kerr effect cannot be neglected and reduces the channel capacity, which is driven by the Nonlinear Schrödinger equations, when increasing too much the transmit power in Wavelength Division Multiplexing. (WDM transmissions).

Once the conditional probability distribution $p_{Y|X}(y|x)$ is accurately known, it is possible to optimize the communication system relying on:
- The design of the input signal such as to maximize the mutual information between the input and the output of the channel,
- The design of optimal receivers, which in general relies on the processing of the likelihood probabilities $p_{Y|X}(y|x)$.

It is still needed a solution to the problem of optimizing the transmission strategy preferably by designing the probability of transmission and optionally the position of each symbol of a constellation, typically (QAM, PSK, etc. for example). The main challenges are:
- Get the channel conditional probability distribution of the channel, decomposed on a functional basis.
- Optimize the input distribution.

The present invention aims to improve the situation.

SUMMARY OF INVENTION

To that end, it proposes a method for optimizing a capacity of a communication channel in a communication system comprising at least a transmitter, a receiver, and the communication channel between the transmitter and the receiver, the transmitter using a finite set of symbols $\Omega=\{\omega_1, \ldots, \omega_N\}$ having respective positions on a constellation, to transmit a message including at least one symbol on said communication channel, and the communication channel being characterized by a conditional probability distribution $p_{Y|X}(y|x)$, where y is the symbol received at the receiver while x is the symbol transmitted by the transmitter.

More particularly, the aforesaid conditional probability distribution $p_{Y|X}(y|x)$ is obtained, for each possible transmitted symbol x, by a mixture model using probability distributions represented by exponential functions, and an optimized input distribution $p_x(x)$ is computed, based on parameters of said mixture model, to define optimized symbols positions and probabilities to be used at the transmitter for optimizing the capacity of the channel.

Therefore, the decomposed representation of the channel conditional probability distribution, in a basis of exponential distribution functions, is used in order to limit the computational complexity of computing the optimal input distribution. By improving the input signal probability distribution according to the channel knowledge, the channel capacity is thus highly improved.

The aforesaid optimized symbols positions and probabilities can be obtained at the transmitter, but also at the receiver as well, in a particular embodiment.

In an embodiment, the transmitter can transmit messages conveyed by a signal belonging to a finite set of signals corresponding respectively to said symbols $\omega_1, \ldots, \omega_N$, each signal being associated with a transmission probability according to an optimized input signal probability distribution corresponding to said optimized input distribution $p_x(x)$. In this embodiment then, the transmitter takes:
- messages to be transmitted, and
- the optimized input signal probability distribution as inputs, and outputs a transmitted signal on the communication channel.

In this embodiment, the communication channel takes the transmitted signal as an input, and outputs a received signal intended to be processed at the receiver (in order to decode the received message at the receiver, typically), the aforesaid conditional probability distribution $p_{Y|X}(y|x)$ being related thus to a probability of outputting a given signal y when the input x is fixed.

Preferably, in this embodiment, the conditional probability distribution $p_{Y|X}(y|x)$ is defined on a continuous input/output alphabet, as a probability density function.

An estimation of the conditional probability distribution $p_{Y|X}(y|x)$ is taken as input, to output the optimized input signal probability distribution $p_x(x)$ to be obtained at the transmitter (and at the receiver in an embodiment), the conditional probability distribution estimation being used then for computing the optimized input signal probability distribution, the conditional probability distribution estimation being approximated by said mixture model.

In an embodiment, the receiver takes the received signal, and also the optimized input signal probability distribution $p_x(x)$, and an estimation of the channel conditional probability distribution $p_{Y|X}(y|x)$ as inputs and performs an estimation of a message conveyed in said received signal.

Therefore, in this embodiment, the receiver can perform an enhanced determination of the conveyed message thanks to the optimized input signal probability distribution $p_x(x)$, from which the channel conditional probability distribution $p_{Y|X}(y|x)$ can be estimated.

In an embodiment, the aforesaid mixed model follows a conditional probability distribution $p_{Y|X}(y|x)$ which is decomposable into a basis of probability distributions exponential functions $g(y|x;\theta)$, where $\theta$ is a parameter set, such that:

$$p_{Y|X}(y|x) = \sum_{j=1}^{K} w_j g(y|x;\theta_j) \quad (E)$$

where K is a predetermined parameter, the sets $\{\theta_j\}, \{w_j\}$ are parameters representing respectively a mean vector coordinates and covariance matrix parameters.

Moreover, in this embodiment, the derivative of the probability distributions exponential functions $g(y|x;\theta)$ are more particularly given by $g(y|x;\theta) = h(y,\theta)\exp(x^T y - a(x,\theta))$, where $h(y,\theta)$ is a function of y and $\theta$, and $a(x,\theta)$ is the moment generating function, x and y being vectors, such that said derivative is given by:

$$\frac{\partial}{\partial x} g(y|x;\theta) = h(y,\theta)\left(y - \frac{\partial}{\partial x} a(x,\theta)\right) \exp(x^T y - a(x,\theta))$$

The aforesaid distribution $p_{Y|X}(y|x)$ can be approximated by a finite set of continuous functions minimizing a metric defined by Kullback-Leibler divergence, by determining parameters set $\{\theta_j\},\{w_j\}$ which minimize the Kullback-Leibler divergence between an analytical observation of $p_{Y|X}(y|x)$ and its expression given by:

$$p_{Y|X}(y|x) = \sum_{j=1}^{K} w_j g(y|x;\theta_j).$$

The input distribution $p_x(x)$ can be represented as a list of N constellation positions as $\{(x_1,\pi_1), \ldots, (x_N,\pi_N)\}$, where $x_i$ and $\pi_i$ denote respectively constellation positions and probability weights, And the input distribution $p_x(x)$ is estimated by solving an optimization problem at the transmitter given by:

$$(x^*, \pi^*) = \underset{x,\pi}{\mathrm{argmax}}\ I(x,\pi)$$

subject to $\sum_{i=1}^{N} \pi_i = 1$ $\sum_{i=1}^{N} |x_i|^2 \pi_i \leq P$ $0 < \pi_i < 1,$ for $i = 1, \ldots, N$ Where:
$I(X,\pi)$ is a mutual information as a function of position vector $x=[x_1, \ldots, x_N]^T$ and weight vector $\pi=[\pi_1, \ldots, \pi_N]^T$,
optimal values are tagged with the superscript *, and
P denotes a total transmit power.
The mutual information can be expressed as:

$$I(x,\pi) = \frac{1}{M}\sum_{i=1}^{N}\sum_{m=1}^{M} \pi_i \log \frac{p_{Y|X}(y_{i,m}|x_i)}{\sum_{j=1}^{N} \pi_j p_{Y|X}(y_{i,m}|x_j)}, \text{ where}$$

$$p_{Y|X}(y|x) = \sum_{j=1}^{K} w_j g(y|x;\theta_j),$$

and argument $y_{i,m}$ are samples from the distribution $p_{Y|X}(y|x_i)$.

In this embodiment, an alternating optimization can be performed iteratively to calculate both $p_x(x)$ and $p_{Y|X}(y|x) = \sum_{j=1}^{K} w_j g(y|x;\theta_j)$, so as to derive from said calculations optimized positions $\pi^{(t)}$ described from a preceding iteration t−1 to a current iteration t as follows:

at first, positions $\pi^{(t)}$ are optimized for a fixed set of symbol positions $x^{(t-1)}$ and previous position values $\pi^{(t-1)}$;

then, symbol positions $x^{(t)}$ are optimized for the thusly determined $\pi^{(t)}$ and previous values of $x^{(t-1)}$, And repeating iteratively these two steps until a stopping condition occurs on the mutual information $I(x,\pi)$.

This embodiment is described in details below with reference to FIG. 2, showing an example of steps of an algorithm involving a Gradient descent on particles representing positions on a telecommunication constellation (QAM, PSK, or other).

The present invention aims also at a computer program comprising instructions causing a processing circuit to implement the method as presented above, when such instructions are executed by the processing circuit.

FIG. 2 commented below can illustrate the algorithm of such a computer program.

The present invention aims also at a system comprising at least a transmitter, a receiver, and a communication channel between the transmitter and the receiver, wherein the transmitter at least is configured to implement the method above.

The invention aims also at a communication device comprising a processing circuit configured to perform the optimization method as presented above.

BRIEF DESCRIPTION OF DRAWINGS

More details and advantages of possible embodiments of the invention will be presented below with reference to the appended drawings.

DESCRIPTION OF EMBODIMENTS

Figure 1:
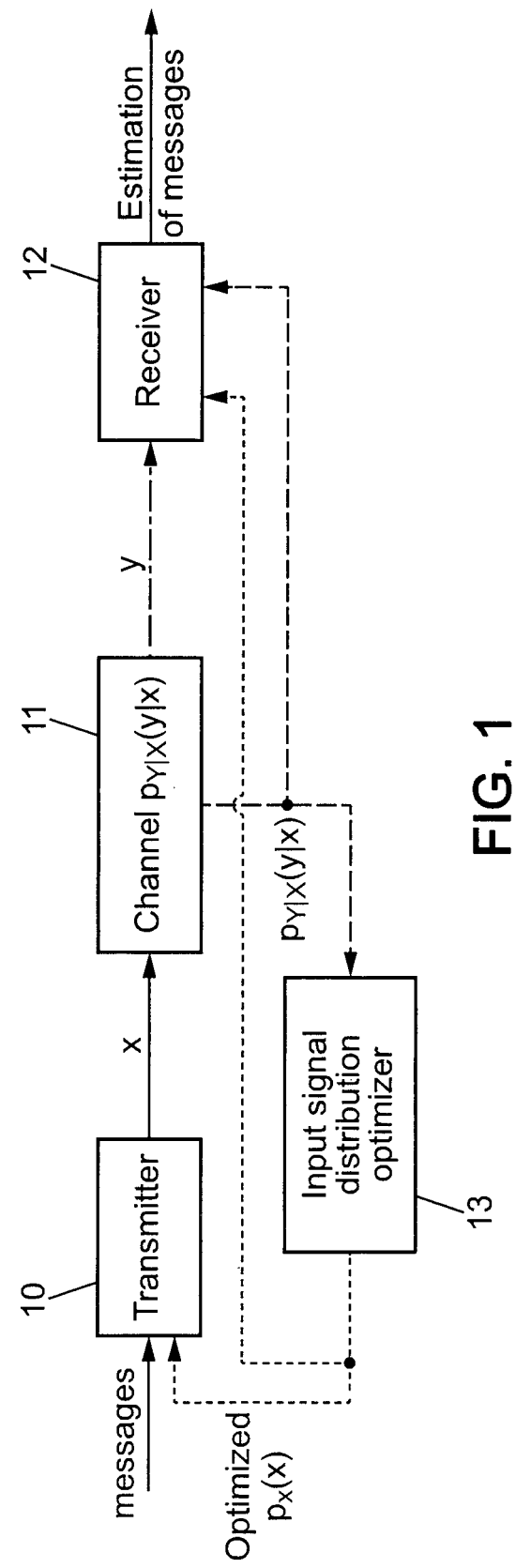
FIG. 1 is an overview of a system according to an example of embodiment of the invention.

Referring to FIG. 1, a system according to the present invention comprises in an example of embodiment a transmitter 10, a receiver 12, a transmission channel 11 and an input signal probability distribution optimizer 13.

The transmitter 10 transmits messages conveyed by a signal belonging to a finite set of signals, each associated with a transmission probability according to an (optimized) input signal probability distribution. The transmitter 10 takes the messages and the (optimized) input signal probability distribution as inputs, and outputs the signal to be transmitted on the channel. The channel 11 takes the transmitted signal as an input, and outputs a received signal which is processed at the receiver 12 in order to decode the transmitted message. It is characterized by a channel conditional probability distribution of the probability of outputting a given signal when the input is fixed. The probability distribution can generally be defined on a discrete or continuous input and/or output alphabet. Here, as an example, the continuous output alphabet is considered, and the probability distribution is called a probability density function in this case.

The input signal probability distribution optimizer 13 takes the conditional probability distribution estimation as an input, and outputs the optimized input signal probability distribution to the transmitter 10 and receiver 12.

Figure 3:
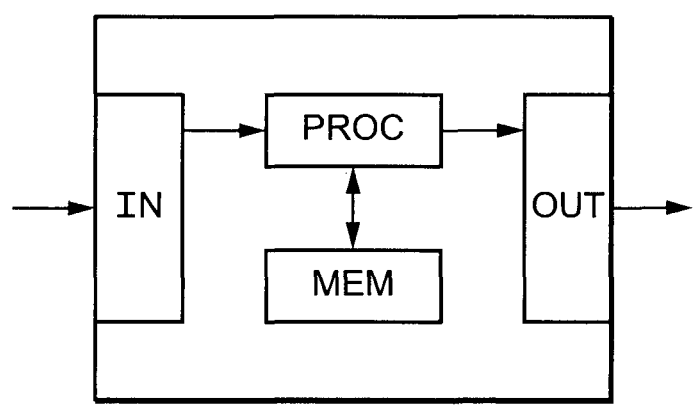
FIG. 3 shows schematically a processing circuit of a communication device to perform the optimization method of the invention.

It is worth noting here that the optimizer 13 can be a same module which is a part of both the transmitter and the receiver. It can be alternatively a module which is a part of a scheduling entity (e.g. a base station or other) in a telecommunication network linking said transmitter and receiver through the communication channel. More generally, a communication device such as the transmitter 10, the receiver 12, or else any device 13 being able to perform the optimization method, can include such a module which can have in practice the structure of a processing circuit as shown on FIG. 3. Such a processing circuit can comprise typically an input interface IN to receive data (at least data enabling the estimation of the conditional probability distribution), linked to a processor PROC cooperating with a memory unit MEM (storing at least instructions of a computer program according to the invention), and an output OUT to send results of optimization computations.

More particularly, the conditional probability distribution estimation is used for computing the optimized input signal probability distribution at the input signal probability distribution optimizer 13. In particular, it is shown hereafter that the optimization is made more efficient when the conditional probability distribution estimation is approximated by a mixture of exponential distributions.

The receiver 12 takes the received signal, the optimized input signal probability distribution and the estimated channel conditional probability distribution as inputs and performs an estimation of the message conveyed in the received signal.

The transmission channel 11 is represented by a model, hereafter, that follows a conditional probability distribution $p_{Y|X}(y|x)$ that can be decomposed into a basis of probability distributions functions $p(y|x;\theta)$, where $\theta$ is a parameter set. For example, the distribution function is the exponential family and the parameters are essentially the mean and variance for the scalar case, and more generally the mean vector and covariance matrix for the multi-variate case, such that:

$$p_{Y|X}(y|x) = \sum_{j=1}^{K} w_j p(y|x;\theta_j) \qquad (E)$$

where K, and the sets $\{\theta_j\},\{w_j\}$ are parameters.

For example, three examples of channels following the model can be cited hereafter.

Channels might have random discrete states when the channel fluctuates randomly in time according to discrete events, such as:
- interference by bursts that changes the signal to noise ratio from one transmission to another,
- shadowing effects that change the received signal power,
- an approximation of a random fading channel by a discrete distribution, where the channel coefficient $\alpha$ is random and follows $p(\alpha) = \sum_{j=1}^{K} w_j \delta(\alpha - \alpha_j)$, where $\alpha_j$ is one out of n possible values of the channel coefficient $\alpha$ occurring with a probability $w_j$, and $\delta(.)$ is the Kronecker function. Thus, in case of Gaussian noise with variance $\sigma_\eta^2$, such fading channel leads to the probability distribution is noted as $$p_{Y|X}(y|x) = \sum_{j=1}^{K} w_j \frac{e^{-\frac{|y-\alpha_j x|^2}{2\sigma_\eta^2}}}{\sqrt{2\sigma_\eta^2}}$$

In case of channel estimation impairments (typically when the transmission channel is imperfectly known), residual self-interference is obtained on the received signal. In general, the channel model is obtained as $=\hat{\alpha}x+\eta-vx$, which leads to:

$$p_{Y|X}(y|x) = \sum_{j=1}^{K} w_j \frac{e^{-\frac{|y-\hat{\alpha}x|^2}{2(\sigma_\eta^2+\sigma_v^2|x|^2)}}}{\sqrt{2(\sigma_\eta^2+\sigma_v^2|x|^2)}}$$

Therefore, it is shown here that, from any known continuous distribution $p_{Y|X}(y|X)$, this distribution can be approximated by a finite set of continuous functions.

The approximation is done by minimizing a metric. One relevant metric is the Kullback-Leibler divergence that allows getting a measure of the difference between two distributions. Thus, when knowing $p_{Y|X}(y|x)$ analytically, it is possible to find parameters set $\{\theta_j\},\{w_j\}$ that minimize the Kullback-Leibler divergence between $p_{Y|X}(y|x)$ and an approximated expression in the form of equation (E) given above.

From an estimated histogram of $p_{Y|X}(y|x)$, it can be approximated by a finite set of continuous functions, in the same way as with a known continuous distribution, by using the Kullback-Leibler divergence as a metric.

The function $p_{Y|X}(y|x)$ is bi-variate with variables x and y which spans in general in a continuous domain.

Hereafter a focus is made on symbols x belonging to a finite alphabet $\Omega=\{\omega_1, \ldots, \omega_N\}$ of cardinality N.

It is further assumed that the derivative of the probability distributions functions $g(y|x;\theta)$ is known. For example, when $g(y|x;\theta)$ is from the exponential family, it can be written:

$$g(y|x;\theta) = h(y,\theta)\exp(x^T y - a(x,\theta)),$$

where $h(y,\theta)$ is a function of y and $\theta$, and $a(x,\theta)$ is the moment generating function, x and y being vectors in this general case. Thus, $$\frac{\partial}{\partial x}g(y|x;\theta) = h(y,\theta)\left(y - \frac{\partial}{\partial x}a(x,\theta)\right)\exp(x^T y - a(x,\theta))$$

For example, in the scalar Gaussian case, the probability density function is thus decomposed as follows:

$$\frac{\partial}{\partial x}\frac{e^{-\frac{|y-\alpha_j x|^2}{2\sigma_\eta^2}}}{\sqrt{2\sigma_\eta^2}} = \frac{2\alpha_j(y-\alpha_j x)}{2\sigma_\eta^2}\frac{e^{-\frac{|y-\alpha_j x|^2}{2\sigma_\eta^2}}}{\sqrt{2\sigma_\eta^2}}$$

The input signal distribution optimizer 13 relies on the estimation of the channel probability distribution in the form of equation (E). When the functional basis chosen for the estimation of the channel is the exponential family, closed form expression can be derived and the algorithm converges to the optimal solution.

The capacity approaching input is deemed to be discrete for some channels. For the case of continuous capacity achieving input (that is the case for more general channels), the input distribution $p_X(x)$ can be represented as a list of N particles as $\{(x_1,\pi_1), \ldots, (x_N,\pi_N)\},$ where $x_i$ and $\pi_i$ denote the positions (i.e., represented by a set of coordinates or by a complex number in a 2-dimension case) and weights, respectively. The optimization problem in the transmitter can be written as $$(x^*, \pi^*) = \underset{x,\pi}{\operatorname{argmax}}\ I(x, \pi) \quad (1)$$

$$\text{subject to } \sum_{k=1}^{N} \pi_i = 1 \quad (2)$$

$$\sum_{k=1}^{N} |x_i|^2 \pi_i \leq P \quad (3)$$

$$0 < \pi_i < 1, \text{ for } i = 1, \ldots, N \quad (4)$$

Where:
$I(x,\pi)$ is the mutual information as a function of position vector $x=[x_1, \ldots, x_N]^T$ and weight vector $\pi=[\pi_1, \ldots, \pi_N]^T$,
the optimal values are shown with the superscript *, and P denotes the total transmit power constraint, which is set arbitrarily. In general, this value is defined by a power budget of the transmitter which is related to the physical limit of the power amplifier or is related to a maximum radiated power allowed by regulation.

The constraint (2) sets the total probability of particles to 1. Constraints (3) and (4) guarantee the total transmit power to be less than or equal to P, and the magnitude of particle probabilities to be positive values less than 1, respectively. The mutual information $I(\hat{x},\pi)$, involves an integration on continuous random variables, but can be approximated by Monte-Carlo integration (the main principle of which is to replace the expectation function, which usually involves an integration, by a generation of samples which are realizations of said random variable and an averaging of the obtained values) as $$I(x, \pi) = \frac{1}{M}\sum_{k=1}^{N}\sum_{m=1}^{M} \pi_i \log \frac{p_{Y|X}(y_{i,m}\ |\ x_i)}{\sum_{j=1}^{N}\pi_j p_{Y|X}(y_{i,m}\ |\ x_j)}, \quad (5)$$

where M denotes the number of samples (i.e., the number of realizations of the random variables generated from their probability distribution), and where $$p_{Y|X}(y|x) = \sum_{j=1}^{K} w_j g(y|x;\theta_j), \quad (6)$$

denoting thus a decomposition of the conditional probability $p_{Y|X}(y|x)$ into a basis of functions $g(\ )$ involving $\theta_j$.

The argument $y_{i,m}$ in (5) are the samples from the distribution $p_{Y|X}(y|x_i)$.

Hereafter, an alternating optimization method is proposed, described from iteration t−1 to t as follows:
at first, optimize $\pi^{(t)}$ for a fixed set of particles $x^{(t-1)}$ and a previous value $\pi^{(t-1)}$;
then, optimize $x^{(t)}$ for the obtained $\pi^{(t)}$ and a previous value $x^{(t-1)}$.

These two steps are detailed hereafter respectively as S1 and S2. They can intervene after an initialization step S0 of an algorithm presented below.

Step S1: Optimization of $\pi^{(t)}$ for a Fixed Set of Particles $x^{(t-1)}$ and a Previous Value $\pi^{(t-1)}$ The optimization in (1) is concave with respect to it for fixed values of x. So, for a given $x^{(t-1)}$, (1) is solved for it by writing the Lagrangian and solving for $\pi_i$ for i=1, ..., N as $$\pi_i^{(t)} = \frac{\exp\left(\beta|x_i^{(t-1)}|^2 + \frac{1}{M}\sum_{m=1}^{M}\log q(x_i^{(t-1)}\ |\ y_{i,m})\right)}{\sum_{j=1}^{N}\exp\left(\beta|x_j^{(t-1)}|^2 + \frac{1}{M}\sum_{m=1}^{M}\log q(x_j^{(t-1)}\ |\ y_{j,m})\right)}, \text{ where} \quad (7)$$

$$q(x_i\ |\ y_{i,m}) = \frac{\pi_i^{(t-1)} p_{Y|X}(y_{i,m}\ |\ x_i)}{\sum_{j=1}^{N}\pi_j^{(t-1)} p_{Y|X}(y_{i,m}\ |\ x_j)}.$$

Here, the expression $$\frac{1}{M}\sum_{m=1}^{M}\log q(x_i^{(t-1)}\ |\ y_{i,m})$$

is the approximation of the mathematical expectation $E[\log q(x_i^{(t-1)}|y_i)]$ according to the random variable $y_i$. The approximation is performed by the above mentioned Monte-Carlo integration, i.e., by generating M samples according to the distribution of $y_i$. The term $$\frac{1}{M}\sum_{m=1}^{M}\log q(x_i^{(t-1)}\ |\ y_{i,m})$$

can be advantageously replaced by a numerical integration or a closed form expression when available.

In (7), $\beta$ denotes the Lagrangian multiplier that can be determined by replacing (7) in (3) with equality for the maximum total transmit power P, and resulting to the non-linear equation $$\sum_{k=1}^{N}\exp\left(\beta|x_i^{(t-1)}|^2 + \frac{1}{M}\sum_{m=1}^{M}\log q(x_i^{(t-1)}\ |\ y_{i,m})\right)[P - |x_i^{(t-1)}|^2] = 0. \quad (8)$$

The non-linear equation (8) can be solved using different tools, e.g., gradient descent based approaches such as Newton-Raphson, or by selecting several values of 16, computing the left part of the equation in (8) and keeping the closest one to 0 in absolute value. And the values of $\pi_i^{(t)}$ are obtained from (7).

Step S2: Optimization of $x^{(t)}$ for a Fixed $\pi^{(t)}$ and Previous $x^{(t-1)}$ The Lagrangian for the optimization in (1) with a given weight vector $\pi^{(t)}$ can be given by:

$$\mathcal{L}(x;\beta,\pi^{(t)}) = I(x,\pi^{(t)}) + \beta(P - \sum_{i=1}^{N}|x_i|^2 \pi_i^{(t)}). \quad (9)$$

The position vector x is obtained such that the Kullback-Leibler divergence $D(p_{Y|X}(y|x_i)\|p_Y(y))$ penalized by the second term in (9) is maximized. This way the value of Lagrangian $\mathcal{L}(x;\beta,\pi^{(t)})$, i.e., penalized mutual information, is greater than or equal to the previous values after each update of the position and weight vectors. This is achieved by gradient ascent based methods, i.e.:

$$x_i^{(t)} = x_i^{(t-1)} + \lambda_t \frac{\partial}{\partial x_i} D(p_{Y|X}(y\ |\ x_i)\|p_Y(y))|_{x^{(t-1)},\pi^{(t)}}$$

where the step size $\lambda_t$ is a positive real number.

In the aforementioned gradient ascent based methods, it is required to compute the derivative of the term $D(p_{Y|X}(y|x_i)\|p_Y(y))$ by Monte-Carlo integration as $$\frac{\partial}{\partial x_i} D(p_{Y|X}(y|x_i)\|p_Y(y))|_{x^{(t-1)},\pi^{(t)}} \approx \frac{1}{M}\sum_{m=1}^{M} h(y_{i,m}, x_i^{(t-1)})\left[1+\right.$$

$$\left.\log\frac{p_{Y|X}(y_{i,m}|x_i^{(t-1)})}{\sum_{j=1}^{N}\pi_j^{(t)} p_{Y|X}(y_{i,m}|x_j^{(t-1)})} - \pi_i^{(t)}\frac{p_{Y|X}(y_{i,m}|x_i^{(t-1)})}{\sum_{j=1}^{N}\pi_j^{(t)} p_{Y|X}(y_{i,m}|x_j^{(t-1)})}\right].$$

where $h(y_{i,m}, x_i) = \frac{\partial}{\partial x_i}\log p_{Y|X}(y_{i,m}|x_i)$.

Using (6), it can be obtained:

$$h(y_{i,m}, x_i) = \frac{\partial}{\partial x_i}\log\left(\sum_{j=1}^{K} w_j g(y_{i,m}|x_i;\theta_j)\right) = \frac{w_i\frac{\partial}{\partial x_i}g(y_{i,m}|x_i;\theta_i)}{\sum_{j=1}^{K} w_j g(y_{i,m}|x_i;\theta_j)}$$

Thus, when $g(y|x;\theta_j)$ is known in a closed form and its derivative is known in a closed form, the equation can be computed.

Finally the $x^{(t)}$ values are obtained and the iteration can continue until a stopping condition is met. The stopping condition is for example an execution time, or if $I(x^{(t)},\pi^{(t)}) - I(x^{(t-1)},\pi^{(t-1)})$ is lower than a given threshold, typically small.

Figure 2:
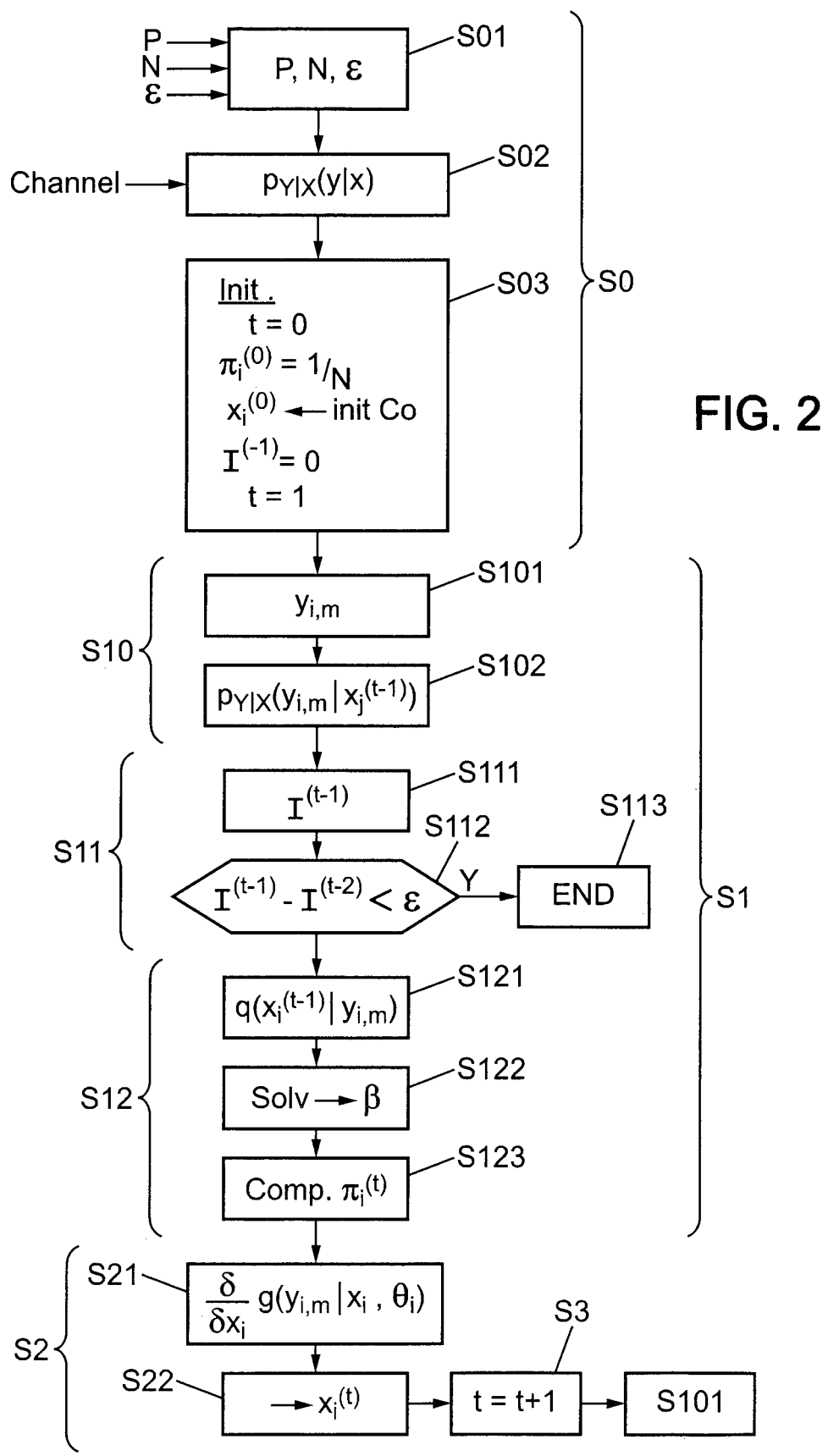
FIG. 2 shows possible steps of an optimization method according to an embodiment of the invention.

An example of algorithm is detailed hereafter, with reference to FIG. 2.

Step S0: Initialization Step
  Step S01: Get the input parameters
    P, the power limit of the constellation
    The initial constellation of N symbols
    The stopping criterion threshold ε
  Step S02: Get the channel conditional probability distribution in the form $p_{Y|X}(y|x)=\sum_{j=1}^{K} w_j g(y|x;\theta_j)$, where K, $w_j$ are sacalar parameters and $\theta_j$ is a parameter set, and where the expression of $$\frac{\partial}{\partial x_i} g(y|x;\theta_j)$$

is known.
  Step S02: Set t=0; Set all $\pi_i^{(0)}=1/N$; Set all $x_i^{(0)}$ from an initial constellation C0; Set $I^{(-1)}=0$; Set t=1
Step S1: Iterative Step t
Step S10: Samples Generation
  S101: For all i in [1,N], generate M samples $y_{i,m}$ from the distribution $p_{Y|X}(y|x=x_i^{(t-1)})$
  S102: For all i in [1,N], for all j in [1,N], compute $p_{Y|X}(y_{i,m}|x_j^{(t-1)})$
Step S11: Compute the Stopping Condition $$I^{(t-1)} = \frac{1}{M}\sum_{i=1}^{N}\sum_{m=1}^{M}\pi_i^{(t-1)}\log\frac{p_{Y|X}(y_{i,m}|x_i^{(t-1)})}{\sum_{j=1}^{N}\pi_j^{(t-1)} p_{Y|X}(y_{i,m}|x_j^{(t-1)})}$$

S111: Compute
S112: $I^{(t-1)}-I^{(t-2)}<\varepsilon$, stop the iterative algorithm (S113). Otherwise, go to S121.

Step S12: Update the Probabilities $\pi_i^{(t)}$
  S121: For all i in [1,N], and m in [1,M], compute $$q(x_i^{(t-1)}|y_{i,m}) = \frac{\pi_i^{(t-1)} p_{Y|X}(y_{i,m}|x_i^{(t-1)})}{\sum_{j=1}^{N}\pi_j^{(t-1)} p_{Y|X}(y_{i,m}|x_j^{(t-1)})}$$

S122: Compute β by solving:

$$\sum_{i=1}^{N}\exp\left(\beta|x_i^{(t-1)}|^2 + \frac{1}{M}\sum_{m=1}^{M}\log q(x_i^{(t-1)}|y_{i,m})\right)[P-|x_i^{(t-1)}|^2] = 0$$

For example by using a Newton-Raphson descent, and/or
  by using a line-search strategy (taking several β values, computing the above expression and selecting the closest to 0);
  S123: For all i in [1,N], compute $$\pi_i^{(t)} = \frac{\exp\left(\beta|x_i^{(t-1)}|^2 + \frac{1}{M}\sum_{m=1}^{M}\log q(x_i^{(t-1)}|y_{i,m})\right)}{\sum_{j=1}^{N}\exp\left(\beta|x_j^{(t-1)}|^2 + \frac{1}{M}\sum_{m=1}^{M}\log q(x_j^{(t-1)}|y_{i,m})\right)},$$

Step S2: Update the Symbols $x_i^{(t)}$ Position with New $\pi_i^{(t)}$ and Previous $x_i^{(t-1)}$
  S21: For all i in [1,N], for all j in [1,N], compute $$\frac{\partial}{\partial x_i} g(y_{i,m}|x_i;\theta_i),$$

which is obtained from the known expression of $$\frac{\partial}{\partial x_i} g(y|x;\theta_i)$$

by substituting y by $y_{i,m}$ and x by $x_i$
  S22: For all i in [1,N], compute $$x_i^{(t)} = x_i^{(t-1)} + \lambda_t \frac{1}{M}\sum_{m=1}^{M} h(y_{i,m}, x_i^{(t-1)})\left[1+\right.$$

$$\left.\log\frac{p_{Y|X}(y_{i,m}|x_i^{(t-1)})}{\sum_{j=1}^{N}\pi_j^{(t)} p_{Y|X}(y_{i,m}|x_j^{(t-1)})} - \pi_i^{(t)}\frac{p_{Y|X}(y_{i,m}|x_i^{(t-1)})}{\sum_{j=1}^{N}\pi_j^{(t)} p_{Y|X}(y_{i,m}|x_j^{(t-1)})}\right]$$

where $h(y_{i,m},x_i^{(t-1)})$ is the value of the function $$h(y_{i,m}, x_i) = \frac{w_i\frac{\partial}{\partial x_i}g(y_{i,m}|x_i;\theta_i)}{\sum_{j=1}^{K} w_j g(y_{i,m}|x_i;\theta_j)} \text{ for } x_i = x_i^{(t-1)}$$

Next step S3 is an incrementing of t to loop, for a next iteration, to step S101.

An artificial intelligence can thus be programmed with such an algorithm to optimize the capacity of a given communication channel (one or several communication channels) in a telecommunication network.

The invention claimed is:

1. A method for optimizing a capacity of a communication channel in a communication system comprising at least a transmitter, a receiver, and said communication channel between the transmitter and the receiver, the transmitter using a finite set of symbols $\Omega=\{\omega_1, \ldots, \omega_N\}$ having respective positions on a constellation, to transmit a message including at least one symbol on said communication channel, wherein N is a positive integer, the communication channel being characterized by a conditional probability distribution $p_{Y|X}(y|x)$, where y is the symbol received at the receiver while x is the symbol transmitted by the transmitter, wherein said conditional probability distribution $p_{Y|X}(y|x)$ is obtained, for each possible transmitted symbol x, by a mixture model using probability distributions represented by exponential functions, and an optimized input distribution $p_x(x)$ is computed, based on parameters of said mixture model, to define optimized symbols positions and probabilities to be used at the transmitter for optimizing the capacity of the channel, and wherein said mixture model follows the conditional probability distribution $p_{Y|X}(y|x)$ which is decomposable into a basis of probability distributions exponential functions $g(y|x;\theta)$, wherein $\theta$ is a parameter set.

2. The method of claim 1, wherein said optimized symbols positions and probabilities are obtained at the transmitter and at the receiver.

3. The method according to claim 1, wherein the transmitter transmits messages conveyed by a signal belonging to a finite set of signals corresponding respectively to said symbols $\omega_1, \ldots, \omega_N$, each signal of the finite set of signals being associated with a transmission probability according to an optimized input signal probability distribution corresponding to said optimized input distribution $p_x(x)$, And the transmitter takes messages to be transmitted and said optimized input signal probability distribution as inputs, and outputs a transmitted signal on the communication channel.

4. The method according to claim 3, wherein the communication channel takes the transmitted signal as an input, and outputs a received signal intended to be processed at the receiver, said conditional probability distribution $p_{Y|X}(y|x)$ being related thus to a probability of outputting a given signal y when the input x is fixed.

5. The method according to claim 4, wherein an estimation of said conditional probability distribution $p_{Y|X}(y|x)$ is taken as input, to output the optimized input distribution $p_x(x)$ to be obtained at least at the transmitter, the conditional probability distribution estimation being used for computing the optimized input signal probability distribution, the conditional probability distribution estimation being approximated by said mixture model.

6. The method according to claim 1, wherein $\theta$ is the parameter set, such that:

$$p_{Y|X}(y|x)=\Sigma_{j=1}^{K} w_j g(y|x;\theta_j) \quad (E)$$

where K is a predetermined parameter, the sets $\{\theta_j\}$, $\{w_j\}$ are parameters representing respectively mean vector coordinates and covariance matrix parameters.

7. The method of claim 6, wherein the derivative of the probability distributions exponential functions $g(y|x;\theta)$ are given by $g(y|x;\theta)=h(y,\theta) \exp(x^T y - a(x,\theta))$, where $h(y,\theta)$ is a function of y and $\theta$, and a $(x,\theta)$ is the moment generating function, x and y being vectors, such that said derivative is given by:

$$\frac{\partial}{\partial x}g(y|x;\theta) = h(y,\theta)\left(y - \frac{\partial}{\partial x}a(x,\theta)\right)\exp(x^T y - a(x,\theta))$$

8. The method according to claim 6, wherein said conditional probability distribution $p_{Y|X}(y|x)$ is approximated by a finite set of continuous functions minimizing a metric defined by Kullback-Leibler divergence, by determining parameters set $\{\theta_j\}$, $\{w_j\}$ which minimize the Kullback-Leibler divergence between an analytical observation of $p_{Y|X}(y|x)$ and its expression given by: $p_{Y|X}(y|x)=\Sigma_{j=1}^{K} w_j g(y|x;\theta_j)$.

9. A method for optimizing a capacity of a communication channel in a communication system comprising at least a transmitter, a receiver, and said communication channel between the transmitter and the receiver, the transmitter using a finite set of symbols $\Omega=\{\omega_1, \ldots, \omega_N\}$ having respective positions on a constellation, to transmit a message including at least one symbol on said communication channel, wherein N is a positive integer, the communication channel being characterized by a conditional probability distribution $p_{Y|X}(y|x)$, where y is the symbol received at the receiver while x is the symbol transmitted by the transmitter, wherein said conditional probability distribution $p_{Y|X}(y|x)$ is obtained, for each possible transmitted symbol x, by a mixture model using probability distributions represented by exponential functions, and an optimized input distribution $p_x(x)$ is computed, based on parameters of said mixture model, to define optimized symbols positions and probabilities to be used at the transmitter for optimizing the capacity of the channel, wherein the transmitter transmits messages conveyed by a signal belonging to a finite set of signals corresponding respectively to said symbols $\omega_1, \ldots, \omega_N$, each signal of the finite set of signals being associated with a transmission probability according to an optimized input signal probability distribution corresponding to said optimized input distribution $p_x(x)$, and the transmitter takes messages to be transmitted and said optimized input signal probability distribution as inputs, and outputs a transmitted signal on the communication channel, wherein the communication channel takes the transmitted signal as an input, and outputs a received signal intended to be processed at the receiver, said conditional probability distribution $p_{Y|X}(y|x)$ being related thus to a probability of outputting a given signal y when the input x is fixed, and wherein the receiver takes the received signal, the optimized input distribution $p_x(x)$ and an estimation of the conditional probability distribution $p_{Y|X}(y|x)$ as inputs and performs an estimation of a message conveyed in said received signal.

10. A non-transitory computer readable medium comprising instructions which, when executed by a processing circuit, causes the processing circuitry to implement the method as claimed in claim 1.

11. A system is configured to implement the method according to claim 1, where the system comprising at least the transmitter, the receiver, and the communication channel between the transmitter and the receiver.

12. A communication device comprising a processing circuit configured to perform the optimization method according to claim 1.

13. A method for optimizing a capacity of a communication channel in a communication system comprising at least a transmitter, a receiver, and said communication channel between the transmitter and the receiver, the transmitter using a finite set of symbols $\Omega=\{\omega_1, \ldots, \omega_N\}$ having respective positions on a constellation, to transmit a message including at least one symbol on said communication channel, wherein N is a positive integer, the communication channel being characterized by a conditional probability distribution $p_{Y|X}(y|x)$, where y is the symbol received at the receiver while x is the symbol transmitted by the transmitter, wherein said conditional probability distribution $p_{Y|X}(y|x)$ is obtained, for each possible transmitted symbol x, by a mixture model using probability distributions represented by exponential functions, and an optimized input distribution $p_x(x)$ is computed, based on parameters of said mixture model, to define optimized symbols positions and probabilities to be used at the transmitter for optimizing the capacity of the channel, and wherein the optimized input distribution $p_x(x)$ is represented as a list of N constellation positions as $\{(x_1,\pi_1), \ldots, (x_N,\pi_N)\}$, where $x_i$ and $\pi_i$ denote respectively constellation positions and probability weights, and wherein said optimized input distribution $p_x(x)$ is estimated by solving an optimization problem at the transmitter given by:

$$(x^*, \pi^*) = \underset{\hat{x},\pi}{\mathrm{argmax}}\ I(x, \pi)$$

$$\text{subject to } \sum_{k=1}^{N} \pi_i = 1$$

$$\sum_{k=1}^{N} |x_i|^2 \pi_i \le P$$

$$0 < \pi_i < 1, \text{ for } i = 1, \ldots, N$$

Where:
$I(x,\pi)$ is a mutual information as a function of position vector $x=[x_1, \ldots, x_N]^T$ and weight vector $\pi=[\pi_1, \ldots, \pi_N]^T$,
optimal values are tagged with the superscript *, and P denotes a total transmit power.

14. The method of claim 13, wherein said mixture model follows the conditional probability distribution $p_{Y|X}(y|x)$ which is decomposable into a basis of probability distributions exponential functions $g(y|x;\theta)$, where $\theta$ is a parameter set, such that:

$$p_{Y|X}(y|x)=\Sigma_{j=1}^{K} w_j g(y|x;\theta_j) \qquad (E)$$

where K is a predetermined parameter, the sets $\{\theta_j\}$, $\{w_j\}$ are parameters representing respectively mean vector coordinates and covariance matrix parameters; and wherein the mutual information is expressed as:

$$I(x, \pi) = \frac{1}{M} \sum_{k=1}^{N} \sum_{m=1}^{M} \pi_i \log \frac{p_{Y|X}(y_{i,m}|x_i)}{\sum_{j=1}^{N} \pi_j p_{Y|X}(y_{i,m}|x_j)},$$

$$\text{where } p_{Y|X}(y|x) = \sum_{j=1}^{K} w_j g(y|x;\theta_j),$$

and argument $y_{i,m}$ are samples from the conditional probability distribution $p_{Y|X}(y|x_i)$.

15. The method of claim 14, wherein an alternating optimization is performed iteratively to calculate both $p_x(x)$ and $p_{Y|X}(y|x)=\Sigma_{j=1}^{K} w_j g(y|x;\theta_j)$, so as to derive from said calculations optimized positions $\pi^{(t)}$ described from a preceding iteration t−1 to a current iteration t as follows:

at first, positions $\pi^{(t)}$ are optimized for a fixed set of symbol positions $x^{(t-1)}$ and previous position values $\pi^{(t-1)}$;

then, symbol positions $x^{(t)}$ are optimized for the thusly determined $\pi^{(t)}$ and previous values of $x^{(t-1)}$, And repeating iteratively these two steps until a stopping condition occurs on the mutual information $I(x,\pi)$.

\* \* \* \* \*